United States Patent [19]

Precht

[11] Patent Number: 4,478,672
[45] Date of Patent: Oct. 23, 1984

[54] DEVICE FOR JOINING PLIES FOR TIRES

[75] Inventor: Hans Precht, Rome, Italy

[73] Assignee: The Firestone Tire & Rubber Company, Akron, Ohio

[21] Appl. No.: 398,533

[22] Filed: Jul. 15, 1982

[30] Foreign Application Priority Data

Jul. 15, 1981 [IT] Italy .................. 67978 A/81

[51] Int. Cl.³ .............. B29C 19/00; B29H 17/00; B32B 31/04; B31F 5/00
[52] U.S. Cl. .................. 156/421; 156/304.1; 156/502; 156/544; 156/582
[58] Field of Search ............ 156/421, 544, 304.1, 156/304.6, 502, 582, 545, 546; 29/121.1, 122, 121.4, 121.5

[56] References Cited

U.S. PATENT DOCUMENTS

| | | |
|---|---|---|
| 1,436,023 | 11/1922 | Elmendorf . |
| 1,924,551 | 8/1933 | Higgins ................. 154/42 |
| 2,348,803 | 5/1944 | Friz ..................... 144/279 |
| 2,516,280 | 7/1950 | Welch ................... 154/116 |
| 2,556,476 | 6/1951 | Lamport ................. 154/42 |
| 2,702,070 | 2/1955 | Lindemann .............. 154/42 |
| 2,929,089 | 3/1960 | Nall .................... 29/122 |
| 3,717,899 | 2/1973 | Gardner et al. ......... 29/122 |
| 3,909,341 | 9/1975 | Moscovita .............. 156/502 |
| 4,224,726 | 9/1980 | Walker ................. 29/121.1 |
| 4,231,836 | 11/1980 | Ljungqvist et al. ..... 156/405 |

FOREIGN PATENT DOCUMENTS

| | | |
|---|---|---|
| 134590 | 6/1946 | Fed. Rep. of Germany ...... 156/544 |
| 1023216 | 7/1958 | Fed. Rep. of Germany . |
| 1061057 | 7/1959 | Fed. Rep. of Germany . |
| 1099718 | 2/1961 | Fed. Rep. of Germany . |
| 2624668 | 1/1977 | Fed. Rep. of Germany . |
| 2446170 | 8/1970 | France . |
| 1374742 | 11/1974 | United Kingdom . |
| 1451831 | 10/1976 | United Kingdom . |

OTHER PUBLICATIONS

Everhard Products, Inc., "Butt Splicing Stitchers", no date given.

Primary Examiner—Edward Kimlin
Assistant Examiner—Merrell C. Cashion
Attorney, Agent, or Firm—Ernst H. Ruf

[57] ABSTRACT

A device (5–120) for joining the plies (1–2) of tires in the green state, in which the plies (1–2) are joined together along adjacent edges (4) by the joint action of a first (87, 93) and a second (36, 42–126) plurality of pairs of rollers disposed one facing the other, the first being above and the second being below the said plies (1, 2) and having a V-disposition with vertex along a junction line of the said edges (4); the rollers of the first plurality of rollers (87, 93), which are externally serrated, being supported by a support body (7) which is adjustable both in height and about a horizontal axis with respect to the second plurality of rollers (36, 42–126), and being connected to an operating unit (101) carried by the said support body (7), with the rollers of each pair being rigidly connected angularly together and being disposed with their ends in contact along a generatrix.

6 Claims, 6 Drawing Figures

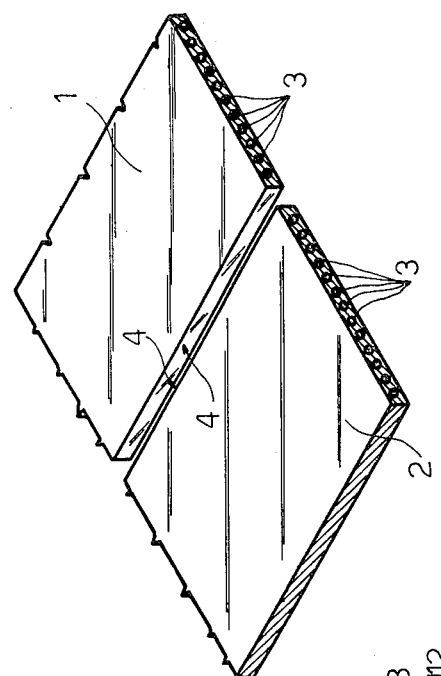
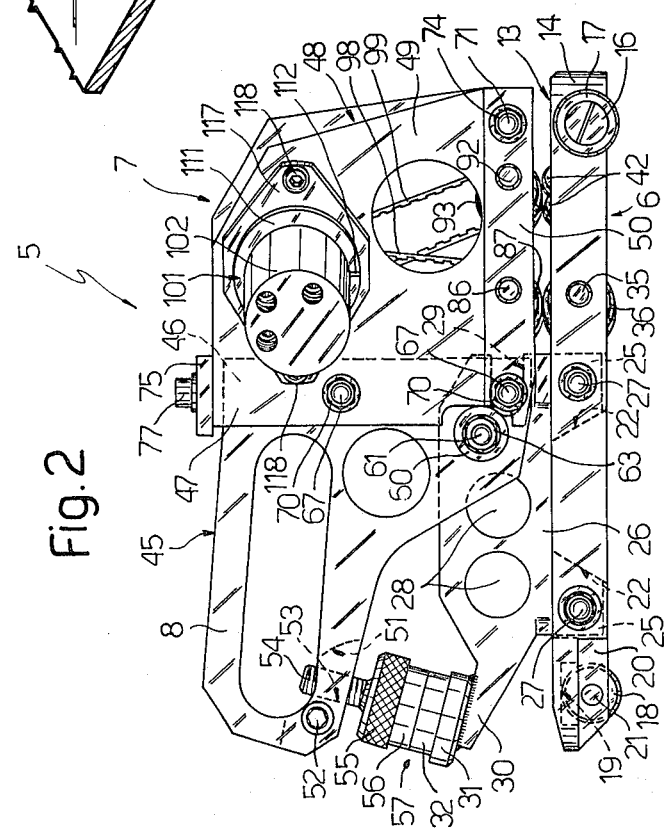

DEVICE FOR JOINING PLIES FOR TIRES

The present invention relates to a device for joining tire plies.

In the formation of tires it is known to utilize plies made of elastomeric material internally reinforced with metal wires orientated transversely or else obliquely with respect to a major dimension of the ply itself. For reasons of production economy these plies are obtained by starting from a continuous work piece in which the said metal wires constitute a kind of axial warp. This work piece is subsequently reduced, by means of transverse or oblique cuts, into a plurality of segments which are then positioned along-side one another and then joined along the adjacent edges in such a way as to form the said plies, the opposite ends of which are generally joined together on a forming cylinder to form a casing.

In the forming of the casing the above-described joining operations certainly represent the most delicate phase from the point of view that an imperfect adhesion of the edges of the different segments, or else superimposition or crossing of the metal wires in the junction region automatically results in rejection of the associated tire.

Until now the said joining operations have normally been effected by hand with, at the most, the aid of a tool comprising a conical roller supported rotatably by a fork having a handle, or else a tool of the type described in U.S. Pat. No. 3,909,341 in which two conical rollers with oblique axes are made to pass over the edges to be joined to press them into contact with one another.

These tools and their manner of use have been derived from a branch of the art, in particular that of the application of wood veneers, entirely removed from the field of the manufacture of tires and demonstrate their origins by the fact that they were particularly adapted for joining the edges of substantially rigid sheet material of relatively little thickness, and show their limitations when used for joining slightly adhesive relatively elastic material of relatively greater thickness.

One of the greatest disadvantages of the tools described above and, in general, of any other tool or joining device derived from the veneering field, is constituted by the fact that during the joining of tire plies the contact pressure between the edges to be joined is not constant throughout the thickness, but varies from a maximum at the surface in contact with the tool to a minimum at the opposite surface which is normally facing toward the interior of the tire.

There is consequently a serious risk that the junction will break down by the effect of cracks which form in the inner side of the junction itself and slowly progress toward the outside until causing rupture of the plies and the collapse of the casing.

The object of the present invention is that of providing a joining device which can eliminate all the above described disadvantages and is able repeatedly to form junctions with constant and excellent characteristics throughout the thickness of the joined edges.

Another object of the present invention is that of providing a joining device which is easy to use, light and of small bulk, which reduces manual intervention by the operator to an indispensible minimum.

The final object of the present invention is that of providing a joining device which will be simple, easy to maintain and economical to produce.

The said objects are achieved by the present invention in that it relates to a device for joining tire plies, characterized by the fact that it comprises a first and a second plurality of pairs of rollers in which the pairs of rollers of each of the said plurality of pairs of rollers are disposed in alignment along on axis of displacement of the device with respect to the two plies to be joined, the rollers of each of the said pairs being disposed in a V disposition with vertex on the said axis and being faced by at least one pair of rollers of the other plurality of rollers and at a given vertical distance therefrom, the said two pluralities of rollers being able to cooperate with the opposite surfaces of the said two plies to be joined along the adjacent edges disposed on opposite sides of the said axis; a separator blade disposed upstream of the said two pluralities of pairs of rollers; drive means for driving the rollers of one of the said two pluralities of pairs of rollers; and means for adjusting the said distance; at least the said driven rollers having outer lateral serrations, and the rollers of each pair of rollers being disposed with their facing ends substantially operatively interconnected along a generatrix.

Further characteristics and advantages of the present invention will become apparent from the following description with reference to the attached drawings, which illustrate several non-limiting embodiments thereof, in which:

FIG. 1 is a partial perspective view of two reinforced plies for the casing of a tire, disposed along-side one another to be connected or joined together;

FIG. 2 is a side view of a joining device formed according to the principles of the present invention, for connecting the said plies of FIG. 1 together;

In FIG. 1 there are illustrated two plies 1 and 2 made of elastomeric material in the raw or green state and internally reinforced with cords or metal wires 3. The latter are disposed substantially parallel to the adjacent lateral edges 4 of the plies 1 and 2, along which these must be connected to form, together with further plies not illustrated, the casing (not illustrated) of a tire.

The connection together of the plies 1 and 2 can take place on a flat bed or else along a generatrix of a forming cylinder (not illustrated) as necessary.

In the case of connection on a flat bed or surface, the connection together of the edges 4 of the plies 1 and 2 is obtained by means of a joining device, illustrated in FIGS. 2, 3, 4 and 5, generally indicated by numeral 5.

Figure 3:
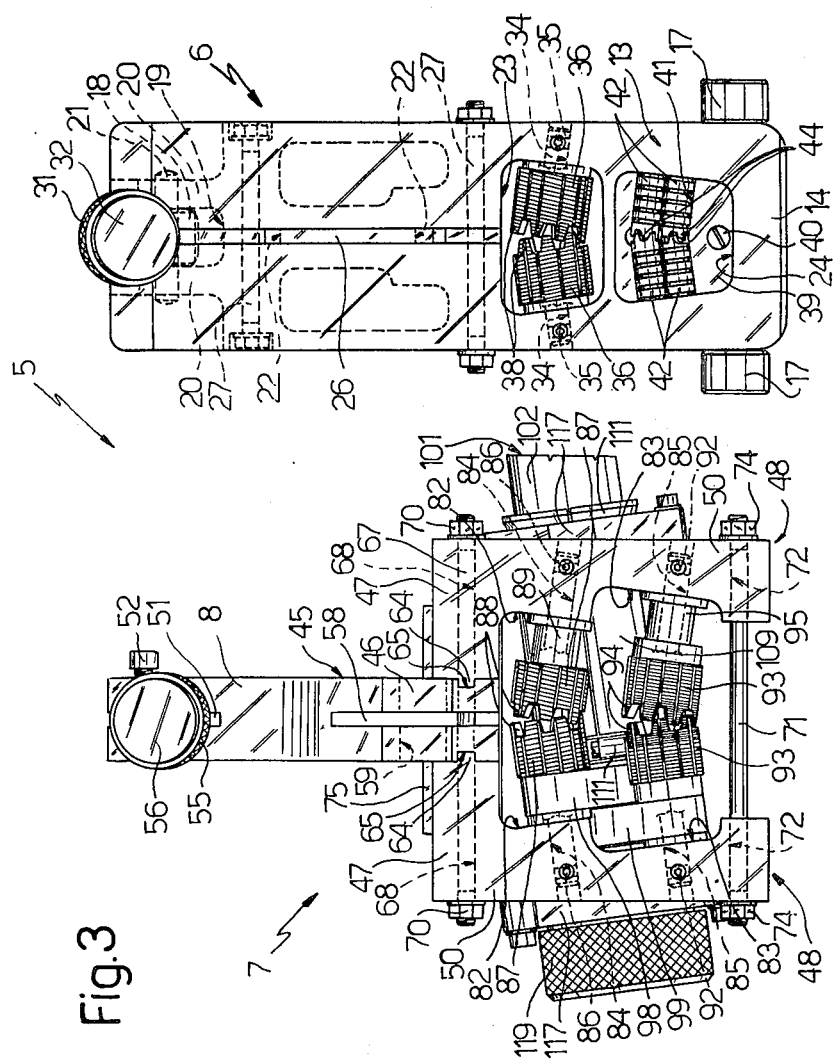
FIG. 3 is a partially exploded plan view of the joining device of FIG. 2.
Figure 4:
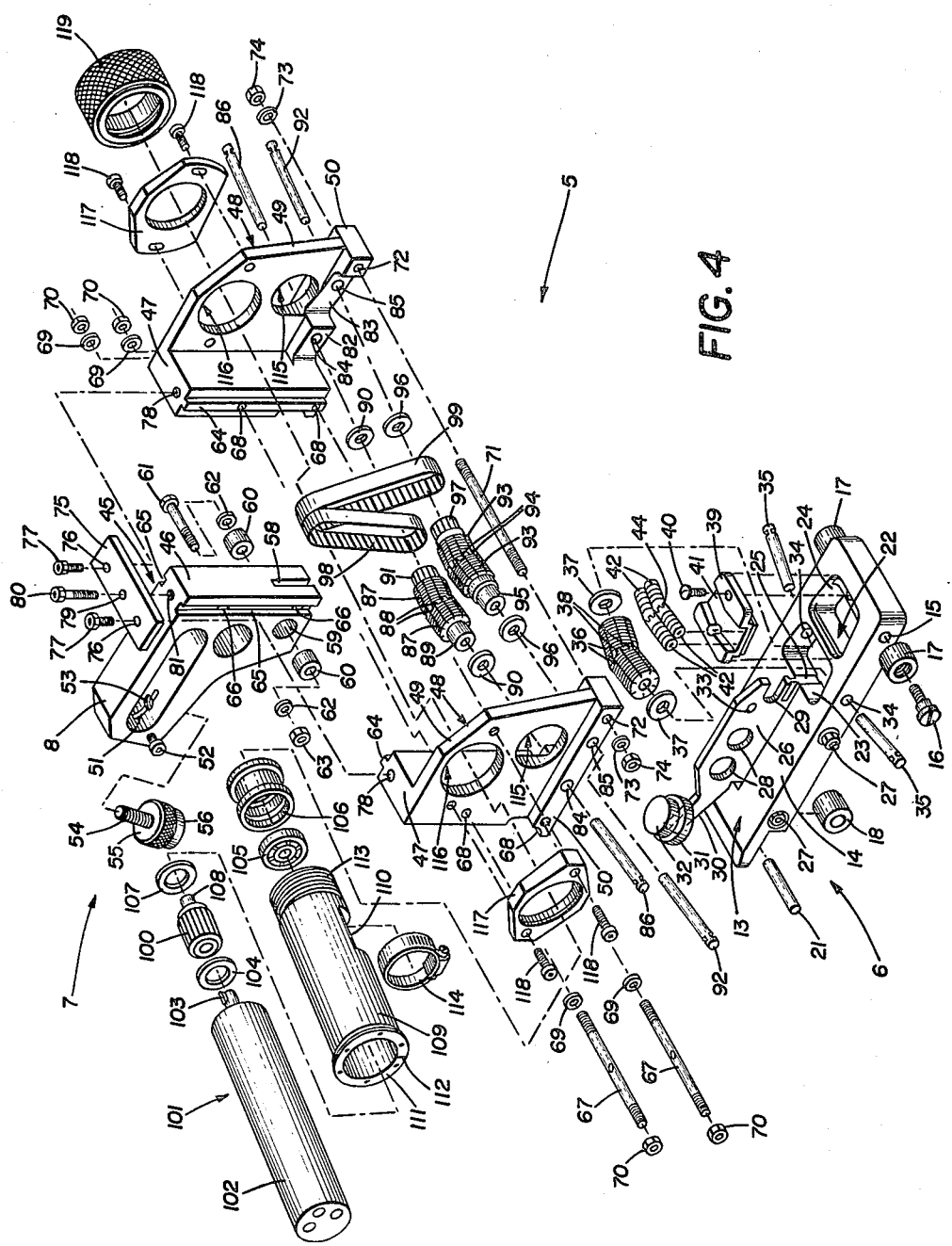
FIG. 4 is an exploded perspective view of the joining device of FIG. 2.

The following description will be made with particular reference to FIG. 4, the other figures mentioned above serving principally for a better understanding of the assembled configuration of the elements illustrated in FIG. 4, and their operation. Moreover, unless otherwise indicated, all the reference numerals cited in the following are to be found in FIG. 4.

Finally, in the following description, the terms "front" and "rear" are used in relation to a working stroke performed by the device 5 along an axis of movement (not illustrated) parallel to the edges 4 to effect joining of the plies 1 and 2.

Figure 5:
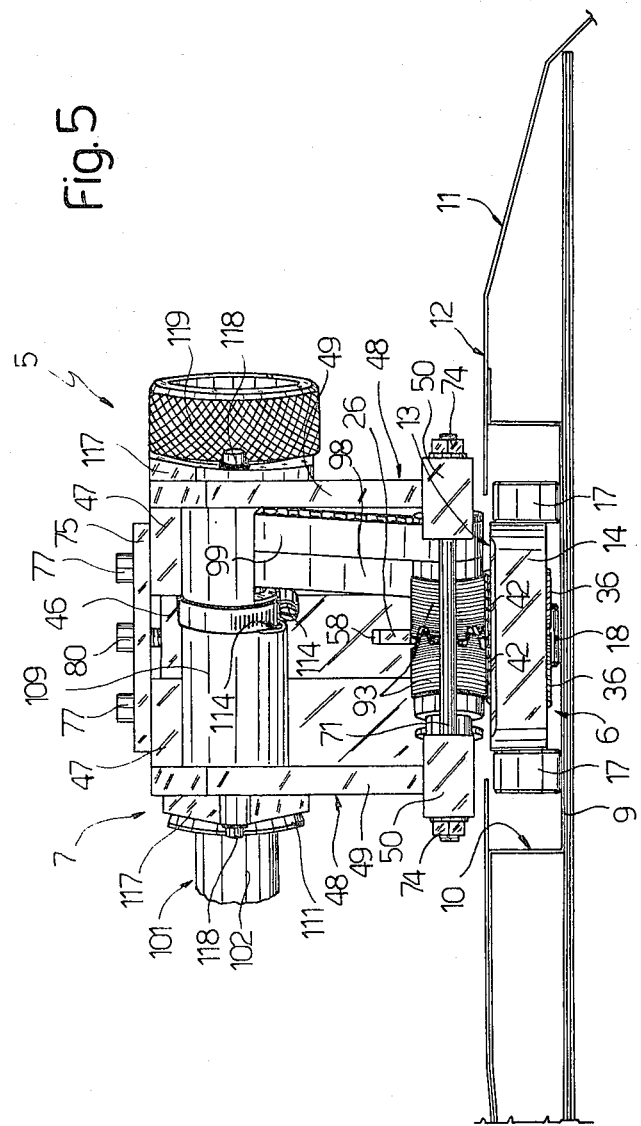
FIG. 5 is a rear elevation of the device of FIG. 2 in one of its operating positions.

The device 5 comprises a lower body 6 constituted by a carriage, and an upper body 7 connected in adjustable manner to the carriage 6 and provided, at the front end, with an operating handle 8 which can be grasped by an operator to impart to the device 5 a to and fro movement toward and away from the operator, during which the carriage 6 is displaced in contact with a lower flat wall 9 (FIG. 5) of a groove 10 (FIG. 5) formed in a work bench 11 (FIG. 5). The latter has a surface 12 (FIG. 5) disposed substantially coplanar with an upper surface 13 of the carriage 6 and can support the work pieces or plies 1 and 2 to be joined, disposed in contact with the surfaces 12 and 13 on opposite sides of the groove 10.

In the carriage 6 the surface 13 constitutes the upper surface of a sole plate 14 having, in a plan view, a substantially rectangular form and provided, close to its rear edge, with two opposite lateral holes 15 engaged by respective screws 16 for supporting associated rollers 17. The latter, together with a central front roller 18 housed within a cavity 19 (FIG. 2) formed between two projections 20 (FIG. 2) extending downwardly from the lower surface of the plate 14 and traversed by a pin 21 rotatably supporting the roller 18 allow easy displacement of the carriage 6.

The plate 14 has, starting from its front end, and in axial alignment, a first and a second slot 22 (FIG. 2) extending therethrough, a first aperture 23 of substantially trapezoidal form tapering toward the rear end of the carriage 6, and a second aperture 24 of form and orientation similar to that of the aperture 23, but of slightly smaller dimensions.

The slots 22, one of which communicates with the cavity 19 and the other with the aperture 23, are engaged by associated projections 25 (FIG. 2) extending from the lower edge of a plate 26 disposed perpendicularly with respect to the surface 13 and indicated in the following description with the term "separator blade." The separator blade 26 is rigidly connected to the plate 14 by means of two through bolts 27 each of which extends through a projection 25 of the plate 10.

The separator blade 26 has a substantially rectangular form and is provided centrally with two lightening through holes 28, rearwardly with a notch 29 formed in its vertical rear edge, and forwardly with a projection 30 inclined forwardly and upwardly and carrying rigidly connected thereto a substantially horizontal disc 31. The latter supports an elastic pad 32, of substantially cylindrical form, the axis of which is substantially tangential to a circumference (not illustrated) centered on a through hole 33 formed through the separator blade 26 between the notch 29 and the holes 28.

Into the interior of the aperture 23 penetrate, through associated lateral holes 34 formed in the plate 14 parallel to the surface 13, two pins 35, converging together and inclined forwardly with respect to a perpendicular to the longitudinal axis of the plate 14, passing through the holes 34.

The two pins 35 freely support two rollers 36 arranged with a V configuration, the vertex of which is on the said axis of movement. Each roller 36 is provided with an associated bearing washer 37 and has an external lateral serrations defined by threading inclined toward the other roller 36.

Each roller 36 is moreover provided with axial teeth 38 coupled with corresponding teeth 38 of the other roller 36. The engagement of the teeth 38 renders the two rollers 36 rigidly angularly interconnected, with rollers 36 being inclined with respect to one another like their respective pins 35 and are substantially in contact with one another along their rear generatrix.

The aperture 24 is closed by a cover 39 connected to the plate 14 by means of screws 40 (only one of which is illustrated) and has in its top a groove 41 forming a V shape, the vertex of which is located on the said axes of movement and the arms of which are parallel to pins 35 and each of which houses a pair of freely rotatable rollers 42, the diameter of each of which is significantly less than that of the rollers 36 and which have external annular grooves. Each roller 42 is provided with axial teeth 44 which mesh with the axial teeth 44 of the corresponding roller of the other pair of rollers 42 in such a way as to make these rigidly connected together in pairs. Like the rollers 36 each roller 42 is also substantially in contact with the corresponding roller 42 of the other pair along a rear generatrix.

As can be seen in FIG. 2, the upper generatrices of all the rollers 42 and of the rollers 36 all lie on the same plane parallel to the surface 13 and are located slightly above the latter.

The upper body 7 includes a front element 45 in turn including the handle 8 and the column 46 rigidly connected to the rear end of the handle 8 and interposed between two front uprights 47 of two lateral cheek or rear elements 48. Each of the latter has, in a plan view, a substantially L-shape form, a smaller arm of which is defined by the associated upright 47, and a larger arm of which is defined by a substantially vertical plate 49, a front edge of which is rigidly connected to the associated upright 47 and a lower edge of which is rigidly connected to an associated basal rib 50.

The handle 8 has at the front a longitudinal slit 51 which divides it into two portions which can be moved resiliently toward one another by means of a transverse screw 52 to lock in position, within a downwardly inclined threaded hole 53, a screw 54 the head of which is constituted by a cylindrical disc 55 supporting an elastic pad 56. The latter is disposed opposite and substantially coaxial to the pad 32 and constitutes with it a resilient shock absorber 57 (FIG. 2).

The upright 46 has an axial groove 58 at the bottom, engaged by the rear part of the blade 26 which separates into two parts a through hole 59 formed transversely in the upright 46 and disposed coaxially to the hole 33. The said two parts of the hole 59 are each engaged by an associated bushing 60 in turn engaged in a rotatable manner by a screw 61 provided with washers 62 and which extends rotatably through the hole 33 and is coupled to a nut 63 to constitute a pivot pin for connecting the body 7 to the carriage 6.

The facing surfaces of the uprights 47 each have a vertical rib 64 slidably mounted within an associated vertical groove 65 formed along the upright 46. The bottom surfaces of the two grooves 65 are traversed by two vertical through slots 66 each engaged by an associated horizontal cylindrical pin 67. Each end of each pin 67 is threaded and engages first an associated hole 68 formed through the associated upright 47 and then a washer 69 and a nut 70, the compression of which causes both transverse and axial locking of the uprights 47 on the upright 46. As illustrated in FIG. 2 the lower pin 67 extends through the notch 29 of the blade 26.

The clamping of the cheeks 48 is completed at the rear by a pin 71, each end of which is threaded and engages an associated hole 72 formed near the rear end of the associated basal rib 50 and then a washer 73 and a nut 74, and at the top by a horizontal plate 75 of substantially rectangular form traversed by three aligned through holes, the outer of which, indicated 76, are engaged by screws 77 screwed into vertical threaded holes 78 formed on the upper ends of the upright 47, and the central one of which, indicated 79, is engaged by an adjustment screw 80, the free end of which engages a vertical hole 81 formed on the upper end of the upright 46.

The inner surface of each basal rib 50 has two inclined surfaces 82 and 83 traversed by horizontal holes 84 and 85 perpendicular to the associated surfaces 82 and 83 and each substantially parallel to an associated hole 34. The holes 84 are traversed by respective pins 86 each of which supports an associated roller 87 provided at one end with axial teeth 88 meshing with the corresponding axial teeth of the other roller 87. At the other end one of the rollers 87 carries a cylindrical spigot 89 cooperating with a washer 90, while the other carries a toothed pulley 91 also cooperating with a bearing washer 90.

The holes 85 are traversed by associated pins 92 each of which supports an associated roller 93 provided at one end with axial teeth 94 meshing with the corresponding axial teeth of the other roller 93. At the other end one of the rollers 93 carries a cylindrical spigot 95 cooperating with a bearing washer 96, while the other also carries a toothed pulley 97 also cooperating with a bearing washer 96.

The rollers 87 are substantially similar to the rollers 36 and, like the latter, are provided with external lateral serrations defined by threading, while the rollers 93 are externally serrated but their toothing is defined by a plurality of cylindrical grooves.

As illustrated in FIG. 2, the rollers 87 and 93 project below the bases 50 and are disposed with the former being mounted directly above the rollers 36 while the latter are mounted directly above the recess defined between the rollers 42.

The pulleys 91 and 97 mesh with associated toothed belts 98 and 99 driven by a double width toothed pulley 100 of a drive unit generally indicated 101. The latter includes a pneumatic motor 102, an output shaft 103 of which is keyed into the pulley 100 with the interposition of a washer 104. The unit 101 further includes a bearing 105 mounted within a cylindrical bushing 106 and engaged, with the interposition of a washer 107, by an axial pin 108 of the pulley 100.

The unit 101 is housed within a tubular body 109 having a lower window 110 through which toothed belts 98 and 99 extend. The tubular body 109 has a conical flange 111 at one end, provided at the bottom with an axial slit 112, and at the other end a threaded section 113, and carries externally a metal clamping band 114 for axially securing the motor 102.

Each cheek 48 is provided with a lower inspection hole 115 and an upper hole 116 provided externally with an annular frame 117 fixed by means of two screws 118. The frames 117 and the holes 116 are traversed by the tubular body 109, the conical flange 111 of which engages forcedly in the interior of one of the frames 117 by the tension effect imparted by a ring nut 119 screwed on the threaded section 113 which projects out from the other frame 117.

Figure 6:
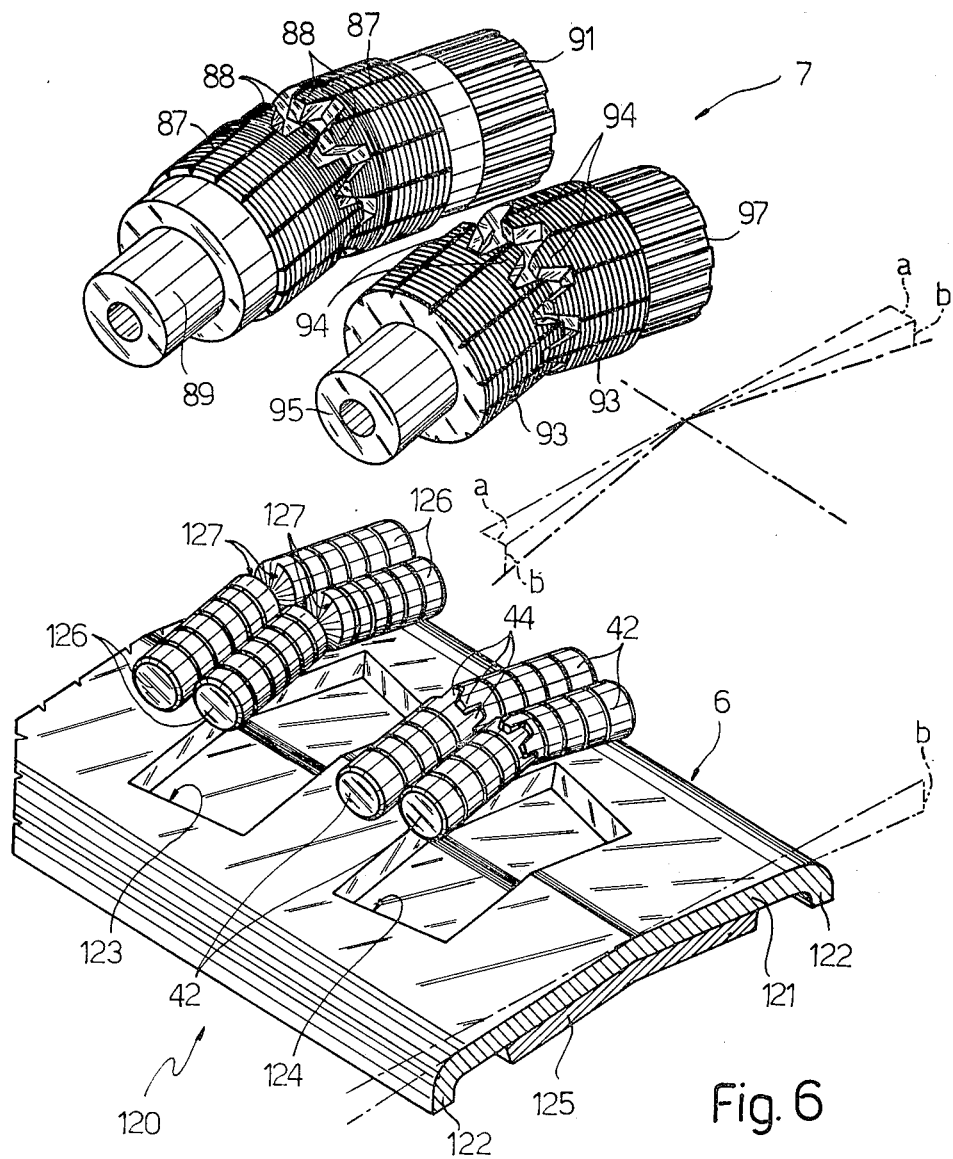
FIG. 6 is an exploded schematic perspective view of a variation of a detail of the joining device of FIG. 2.

The variation illustrated in FIG. 6 relates to a joining device 120 substantially identical to the device 5, which differs in various details, which make it suitable to be utilized for joining plies 1 and 2 about a forming cylinder (not illustrated) such as a tire building drum). For this purpose, in the device 120 the two rollers 87 and the two rollers 93, which are structurally identical with the corresponding rollers of the device 5, have a double inclination. As illustrated graphically in FIG. 6, the rollers 87 and 93 of the device 120 have, as well as an inclination a in a horizontal plane similar to that of the corresponding rollers of the device 5, also an inclination b in a vertical plane.

In the lower element 6 of the device 120 the plate 14 with the rollers 17 and 18 of the device 5 is exchanged for a plate 121 having two lateral ribs 122 serving as sliding shoes. The plate 121 has, in transverse section, an inverted V-shape with inclinations to the horizontal equal to the angle b.

Through the plate 121 there are formed two windows 123 and 124 closed underneath by a plate 125 rigidly connected to the plate 121 and disposed transversely with respect to a longitudinal axis of the latter. Both the windows 123 and 124 have, in plan, a substantially V-shape, the vertex of which lies on the said longitudinal axis and the arms of which are turned rearwardly by an angle a.

The rear window 124 is substantially identical, in a plan view to the groove 41 in element 39 and houses two pairs of freely rotatable axially toothed rollers 42 having the double inclination a and b and disposed directly beneath the rollers 93.

The front window 123 houses within it two pairs of freely rotatable rollers 126 having the double inclination a and b and disposed directly beneath the rollers 87. As opposed to the rollers 42, the rollers 126 do not have axial teeth but are each provided with a conical end surface 127 disposed in contact with the corresponding surface of the roller 126 of the other pair.

From the preceding description it is clear how, in both the devices 5 and 120, the two rear elements 48 constitute, together with the drive unit 101, the belts 98 and 99 and the upper rollers 87 and 93, an assembly which can perform two distinct adjustment movements with respect to the lower body 6. The first of these movements comprises a translation along the grooves 65 by, at most, an amount equal to the radial play existing between the pins 67 and the slots 66, while the second movement comprises a rotation of a hole 33 of the upper body 7 with respect to the lower body 6 about the axis of the pin 61.

In practice adjustment is effected in the following manner:

Initially, the nuts 70, which rigidly connect cheeks 48 and the element 45 are slackened, and the screw 54 is turned in such a way as to obtain a certain amount of play between the buffers 32 and 56 of the shock absorber 57. Subsequently, the screw 80 is turned in such a way as to raise the cheeks 48 and then the rollers 87 and 93 with respect to the front element 45 and the lower body 6. Subsequently, the nuts 70 are slightly tightened and the screw 80 is operated in the opposite direction from that described before until the rollers 87 have been brought into firm contact with a specimen (not illustrated) of the plies 1 and 2 previously interposed between the bodies 6 and 7. The disc 55 is then turned in such a way that the associated buffer 56 comes into contact with the buffer 32 and acts thereon in such a way as to cause rotation of the body 7 about the pin 61 and a progressive approach of the rollers 93 to the lower body 6. When these rollers 93 have also been positioned in firm contact with the said specimen the nuts 70 are finally tightened and the device 5, 120 is ready for use. Obviously the contact pressure between the said specimen and the rollers carried by the bodies 6 and 7 can be varied with extreme precision in dependence on the materials used to form the plies 1 and 2 simply by acting on the screws 80 and 54.

In use the two plies 1 and 2 to be joined are disposed with their edges 4 in contact with the opposite surfaces of the blade 26, the function of which is that of guiding the plies 1 and 2 in such a way as to prevent them from touching one another before reaching the roller 36 (126)–87. Subsequently, the operator pulls the device 5 (120) towards himself in such a way as to bring the periphery of the plies 1 and 2 adjacent to the edges 4 beneath the rollers 87.

The latter, because of their external lateral serrations and their inclination in a horizontal plane, urge the edges 4 towards one another until bringing them into contact. This is assisted also by the particular helical configuration of the said serrations of the rollers 87 which prevents any superficial sliding of the elastomeric material of the work pieces 1 and 2. Because of the presence of the freely rotatable rollers 36 (126) carried into rotation by the rollers 87 via the plies 1 and 2, the transverse thrust applied to the latter is substantially uniform throughout the whole of their thickness in such a way that, on leaving the first train of rollers 87-36 (126), the two edges 4 are in contact with one another with the same pressure throughout their thickness whatever their form, that is to say they are directed as in FIG. 1 in order to obtain a simple butt joint, and they are inclined to obtain, in a known way not illustrated, a superimposed joint.

The connection between the edges 4 is strengthened by the passage of these between the rollers 93 and 42, the inclination of which in the horizontal plane guarantees the persistence of the contact pressure between the edges 4. Moreover, the presence of the two pairs of lower rollers 42 guarantees the application to the plies 1 and 2 of a better distributed transverse pressure which interacts with the said contact pressure to strengthen the uniform connection of the edges 4 throughout their thickness.

In the case of the device 120, the utilization of the double lower rollers 126 guarantees the application to the plies 1 and 2 of a better distributed pressure which is necessary because, when the plies 1 and 2 are wound about a forming cylinder, the edges 4 are brought together by elastically stretching the plies themselves.

As far as the axial teeth 38, 44, 88, and 94 are concerned, it is suitable to indicate that these guarantee the angular connection of the pairs of rollers 36, 42, 87 and 93 and prevent the occurrence of any sliding of one edge 4 with respect to the other during the joining.

Finally, as far as the rollers 36, 42, 87 and 93 are concerned it is sufficient to state that the fact that each of these is substantially in contact at its end with the associated adjacent roller along a rear generatrix ensures that the ply obtained by joining of the plies 1 and 2 shall be of substantially uniform thickness even along the joint line in such a way as to present, after vulcanization, elastic characteristics which are substantially uniform throughout its extent.

I claim:

1. A compact, motorized tool for joining uncured elastomeric plies of tires on a rigid support, said tool comprising a first and second plurality of pairs of rollers, said rollers being rigidly interconnected, the rollers of each of said pairs being arranged in a V configuration along an axis of displacement of the tool relative to two plies to be joined, said two pluralities of rollers being adapted to cooperate with opposite surfaces of said two plies to be joined along facing edges disposed on opposite sides of said axis; and a separator blade being arranged upstream from said rollers; said tool being characterized in that it further comprises a first and a second body supporting said first and second plurality of pairs of rollers respectively, said two bodies being pivotally connected to each other for relative rotation about an axis perpendicular to said axis of displacement; adjustment means interposed between said two bodies to adjust their relative angular position about said axis of rotation; and driving means to rotate the rollers of one of said pluralities of rollers about their axes, the rollers of the other plurality of rollers being idle, said rollers being substantially cylindrical in shape and being each arranged with its lateral surface facing the lateral surface of at least one corresponding roller of the other plurality of rollers, the rollers of each of said pair of rollers being disposed with their facing ends substantially in contact along a generatrix, and at least each of said driven rollers having lateral serrations adapted to positively engage the respective ply, said pairs of driven rollers and said pairs of idle rollers being subdivided into two groups which are aligned along said axis of displacement, the lateral serrations of the driven rollers of that of said groups which is closest to said separator blade comprising a helical threading, said rollers of each pair of driven rollers and at least one of each pair of idle rollers of the other of said groups being rigidly connected together angularly by coupling means.

2. A tool as claimed in claim 1, characterized in that the lateral serrations of the driven rollers of the other of said groups are defined by a plurality of annular grooves.

3. A tool as claimed in claim 1, characterized in that the said coupling means include corresponding intermeshing teeth extending axially from said rollers.

4. A tool as claimed in claim 1, characterized in that said second body comprises a sole plate, to which said separator blade is connected, said idle rollers being supported by said sole plate.

5. A tool as claimed in claim 1, characterized in that said first body includes a forward element and a rear element connected together in such a way so as to be slideable in a direction substantially perpendicular to the said axis of rotation and of displacement, with said rear element supporting said driving means and said driven rollers.

6. A tool as claimed in claim 5, characterized in that said adjustment means include screw means interposed between said forward element and said rear element for displacing the latter with respect to the former, and a resilient shock absorber of adjustable length interposed between said forward element and said lower body; releaseable locking means being provided for locking said forward and rear elements with respect to one another.

* * * * *